(12) United States Patent
Krishnaswamy et al.

(10) Patent No.: US 8,520,552 B2
(45) Date of Patent: Aug. 27, 2013

(54) METHOD FOR DETERMINING MUTUAL AND TRANSITIVE CORRELATION OVER A WIRELESS CHANNEL TO FORM LINKS AND DELIVER TARGETED CONTENT MESSAGES

(75) Inventors: Dilip Krishnaswamy, San Diego, CA (US); Vincent D. Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 734 days.

(21) Appl. No.: 12/652,378

(22) Filed: Jan. 5, 2010

(65) Prior Publication Data
US 2011/0164530 A1 Jul. 7, 2011

(51) Int. Cl.
*H04L 12/28* (2006.01)
(52) U.S. Cl.
USPC .......................................... 370/254; 375/130
(58) Field of Classification Search
USPC ........................................ 370/254; 375/130
See application file for complete search history.

(56) References Cited

U.S. PATENT DOCUMENTS

| | | | |
|---|---|---|---|
| 6,985,467 B2 * | 1/2006 | Lomp et al. | 370/335 |
| 2006/0109810 A1 * | 5/2006 | Au et al. | 370/328 |
| 2007/0083297 A1 | 4/2007 | Tengler et al. | |
| 2008/0109317 A1 * | 5/2008 | Singh | 705/14 |
| 2009/0077601 A1 * | 3/2009 | Brailean et al. | 725/109 |
| 2009/0271212 A1 | 10/2009 | Savjani et al. | |
| 2010/0291928 A1 * | 11/2010 | Valdez | 455/436 |

FOREIGN PATENT DOCUMENTS
WO  WO03073304 A1  9/2003

OTHER PUBLICATIONS

International Search Report and Written Opinion—PCT/US2011/020269, ISA/EPO—May 17, 2011.

* cited by examiner

*Primary Examiner* — Wei Zhao
(74) *Attorney, Agent, or Firm* — Jeffrey D. Jacobs

(57) ABSTRACT

A wireless node configured to store information, discover another wireless node by correlating the stored information with assist information from said another wireless node, and determine whether to establish a wireless link with said another wireless node based, at least in part, on the correlation.

57 Claims, 15 Drawing Sheets

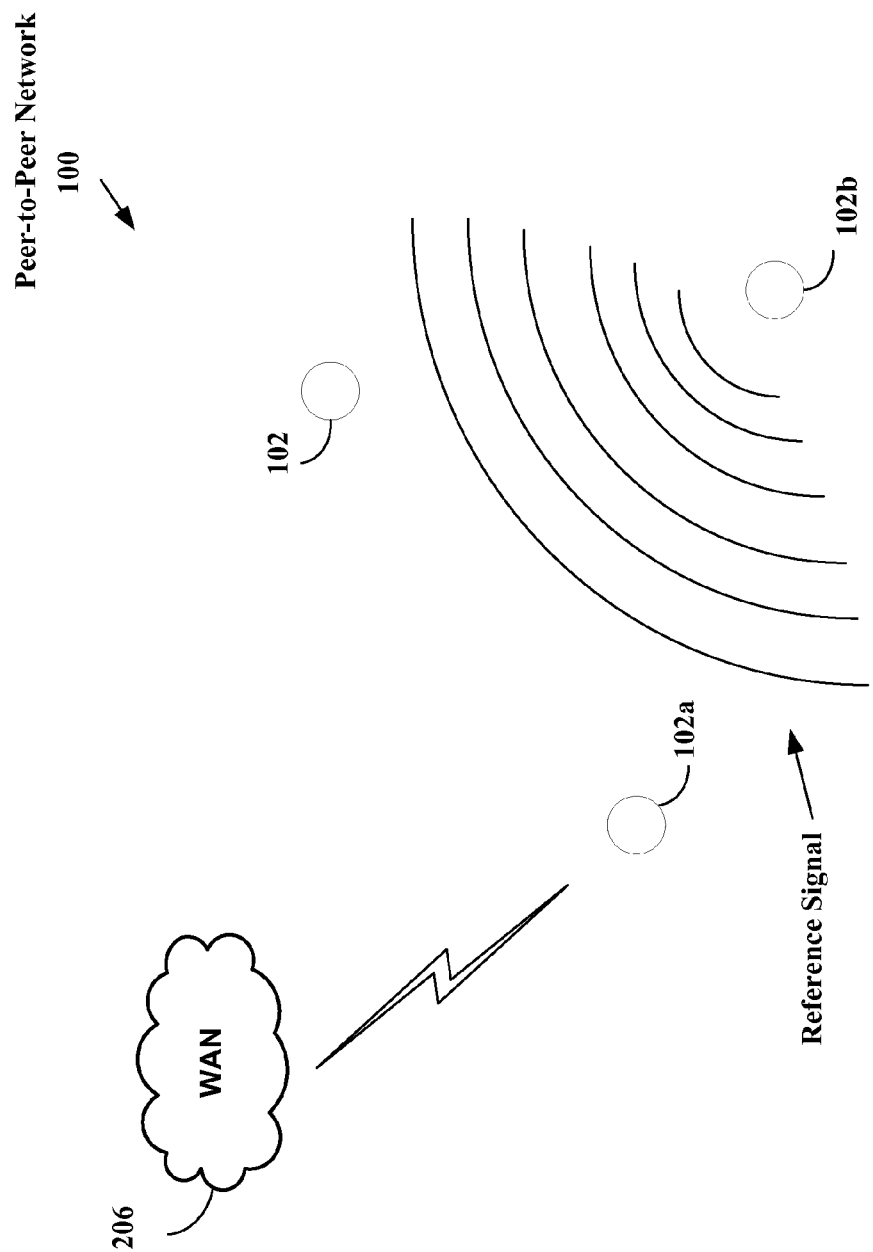

METHOD FOR DETERMINING MUTUAL AND TRANSITIVE CORRELATION OVER A WIRELESS CHANNEL TO FORM LINKS AND DELIVER TARGETED CONTENT MESSAGES

BACKGROUND

1. Field

The present disclosure relates generally to wireless communications, and more specifically, to various apparatus and methods for establishing local wireless connectivity between multiple wireless nodes based on correlation information.

2. Background

Peer-to-peer ("P2P") wireless networks are commonly used for connecting nodes via adhoc connections. These networks differ from the traditional client-server model where communications are usually with a central server. A peer-to-peer network may consist solely of peer nodes that communicate directly with one another, or may include a small number of servers to provide various services to the nodes in the network. These networks are useful for efficiently sharing files, media streaming, telephony, real-time data applications, and other communications.

In peer-to-peer wireless networks, various discovery and acquisition procedures are employed to enable nodes to establish wireless links. By way of example, a wireless node may advertise its availability by broadcasting service information. The service information may include parameters for establishing a wireless link with another wireless node. The parameters may include the access protocol, the data rates supported, the quality of service available, security, as well as other parameters. The service information may be used by another wireless node in the network to initiate an acquisition procedure to establish a wireless link using various access mechanisms defined by the network.

As the sophistication and complexity of peer-to-peer wireless communications continue to grow, it becomes increasingly more desirable to implement intelligent discovery and acquisition procedures between wireless nodes. These procedures should be applicable to other networks as well.

SUMMARY

In one aspect of the disclosure, a wireless node includes a processing system configured to store information, the processing system being further configured to discover another wireless node by correlating the stored information with assist information from said another wireless node, and determining whether to establish a wireless link with said another wireless node based, at least in part, on the correlation.

In another aspect of the disclosure, a wireless node includes first means for correlating information with observed assist information from a remote wireless node, and second means for determining whether the remote wireless node should establish a wireless link based, at least in part, on the correlation.

In yet another aspect of the disclosure, a method of communications at a wireless node includes correlating information with observed assist information from a remote wireless node, and determining whether the remote wireless node should establish a wireless link based, at least in part, on the correlation.

In a further aspect of the disclosure, a computer product for a wireless node including a computer-readable medium having first code for correlating information with observed assist information from a remote wireless node, and second code for determining whether the remote wireless node should establish a wireless link based, at least in part, on the correlation.

BRIEF DESCRIPTION OF THE DRAWINGS

Aspects of various apparatus and methods, and the environments in which they operate, will now be presented in the detailed description that follows, and in the accompanying drawings, wherein:

FIG. 5A is a conceptual diagram of yet another exemplary peer-to-peer wireless network illustrating a wireless node broadcasting a reference signal;

DETAILED DESCRIPTION

Aspects of various apparatus and methods, and the environments in which they operate, will be described below. These apparatus and methods, however, may be embodied in many different forms and should not be construed as limited to the various configurations presented throughout this disclosure. Rather, the various aspects of these apparatus and methods are provided so that this disclosure will be thorough and complete, and will fully convey the scope of the present invention to those skilled in the art. As those skilled in the art will readily appreciate, various details may be presented for the purpose of providing a thorough understanding of these apparatus and methods, however, various configurations of these apparatus and methods may be implemented without these specific details. In some instances, well-known structures and components are shown in block diagram form in order to avoid obscuring the various concepts presented throughout this disclosure.

In the following detailed description, aspects of various apparatus and methods will be described in the context of a peer-to-peer wireless network. However, as those skilled in the art will readily appreciate, the present invention may be extended to a broad array of networks and communication protocols. Accordingly, any reference to a peer-to-peer wireless network is intended only to illustrate aspects of various apparatus and methods, with the understanding that such aspects have a wide range of applications.

Figure 1:
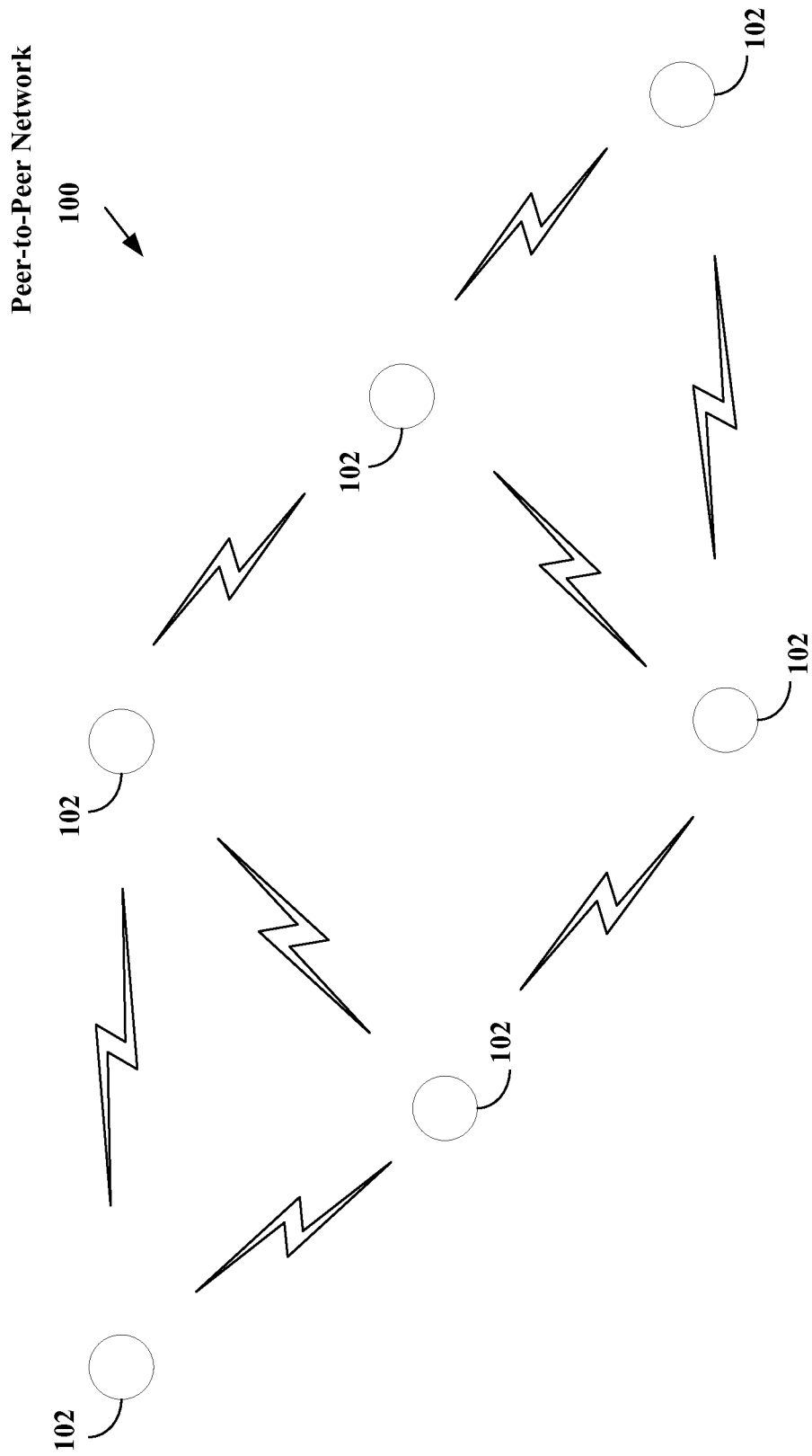
FIG. 1 is a conceptual diagram of an exemplary peer-to-peer wireless network.

An example of a peer-to-peer wireless network will now be presented with reference to FIG. 1. The peer-to-peer wireless network may be implemented with any suitable wireless access protocol. By way of example, the network may be implemented with a distributed MAC (Media Access Control) peer-to-peer protocol, similar to UWB (Ultra-Wideband) networks, but not necessarily limited to short range communications. Long range communications may be supported by a physical layer, similar to UMB (Ultra Mobile Broadband) or LTE (Long Term Evolution). UMB is an air interface standard promulgated by the 3rd Generation Partnership Project 2 (3GPP2) as part of the CDMA1000 family of standards and employs multiple access techniques such as Code Division Multiple Access (CDMA) to provide broadband Internet access to mobile subscribers. LTE is a project within the 3rd Generation Partnership Project (3GPP) to improve the UMTS (Universal Mobile Telecommunications System) mobile phone standard based on OFDMA (Orthogonal Frequency Division Multiple Access) technology. However, as those skilled in the art will readily appreciate, aspects of the various apparatus and methods presented throughout this disclosure may be extended to any suitable network regardless of the wireless access protocol. Accordingly, any reference to a specific wireless access protocol is intended only to illustrate aspects of various apparatus and methods, with the understanding that such aspects have a wide range of applications.

Turning to FIG. 1, a peer-to-peer wireless network 100 is shown with a number of wireless nodes 102, each which may be implemented as different devices. By way of example, a wireless node 102 may be configured as a laptop computer, a mobile telephone, a personal digital assistant (PDA), a digital audio player, a game console, a digital camera, a digital camcorder, a multimedia device, or any other suitable device capable of supporting a peer-to-peer connection with other wireless nodes 102 in the network 100. The wireless node 102 may be referred to by those skilled in the art as a handset, wireless communications device, user terminal, user equipment, mobile station, mobile unit, subscriber unit, subscriber station, mobile radio, radio telephone, wireless station, wireless device, or some other terminology. The various concepts described throughout this disclosure are intended to apply to all wireless nodes regardless of their specific nomenclature.

In this example, the peer-to-peer network 100 is a self-configuring network of wireless nodes 102 connected by wireless links, which together forms an arbitrary wireless topology. A wireless node 102 may take advantage of the wireless topology to support a connection with another wireless node 102 in the network 100, either directly or through one or more intermediary nodes 102. Since the wireless nodes 102 are free to move throughout the coverage region, the wireless topology may change rapidly. Consequently, the peer-to-peer network 100 is dynamically reconfigurable to maintain the connection as the wireless nodes 102 move throughout the coverage region.

Various approaches may be used to establish peer-to-peer connectivity. By way of example, a peer-to-peer connectivity may be established any of the processes or methods disclosed in U.S. patent application Ser. No. 11/775,859 entitled "Paging a Peer in a Peer-to-Peer Communication Network," U.S. patent application Ser. No. 12/163,179 entitled "Methods and Apparatus for Securely Advertising Identification and/or Discovery Information," and U.S. patent application Ser. No. 12/361,853 entitled "Methods and Apparatus for Forming, Maintaining and/or Using Overlapping Networks," the contents of each which is incorporated herein by reference in its entirety.

Figure 2:
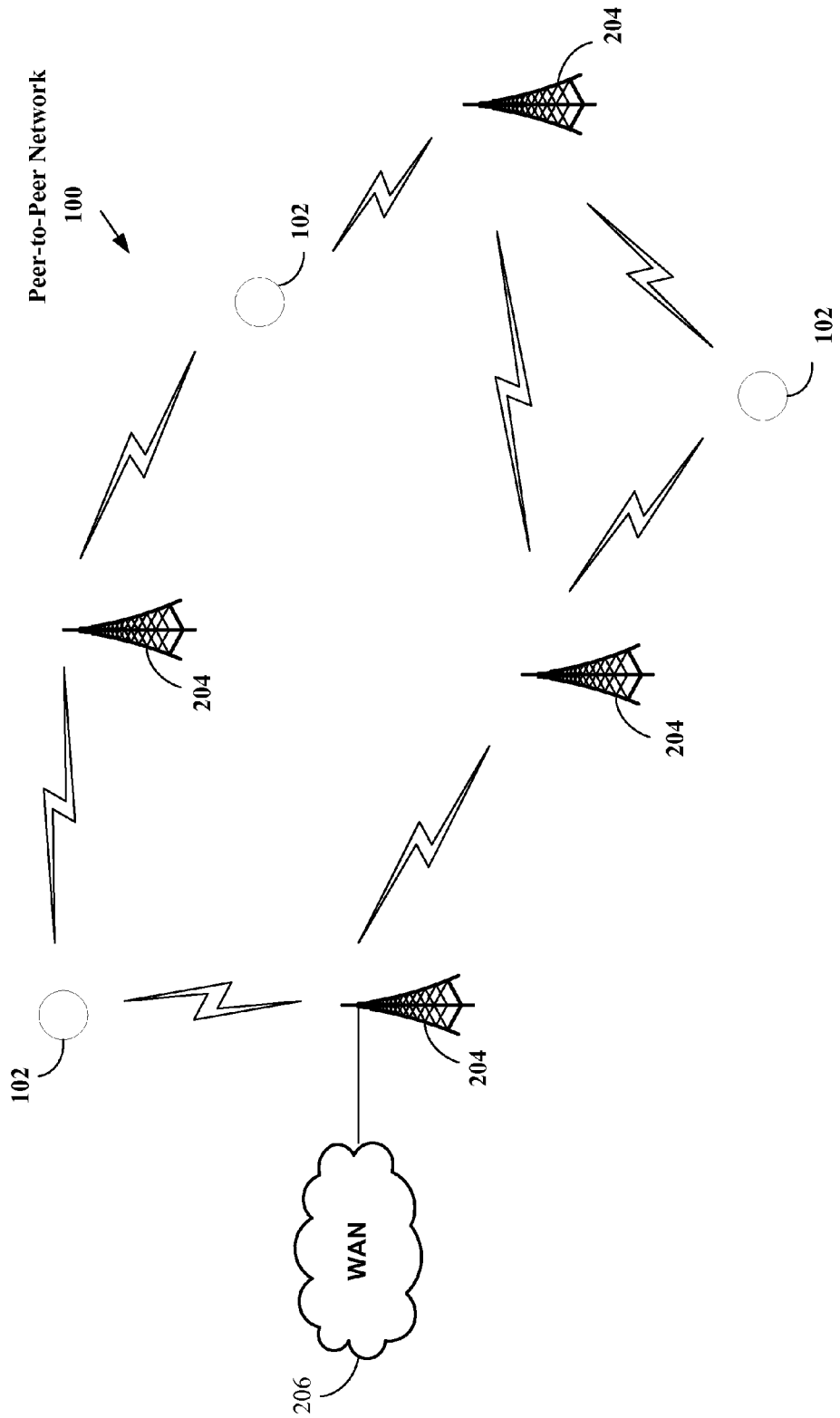
FIG. 2 is a conceptual diagram of another exemplary peer-to-peer wireless network.

FIG. 2 is a conceptual diagram illustrating another example of a peer-to-peer wireless network. In this example, the network 100 is shown with several fixed-site nodes 204. A fixed-site node 204 may be referred to by those skilled in the art as an access point, relay point, NodeB, radio network controller (RNC), eNodeB, base station controller (BSC), base transceiver station (BTS), base station (BS), transceiver function (TF), radio router, radio transceiver, basic service set (BSS), extended service set (ESS), radio base station (RBS), or some other suitable terminology.

A wireless node 102 may connect to another wireless node in the network 100, either directly or through one or more wireless and/or fixed-site nodes. Like the examples described earlier, the wireless topology is dynamically reconfigurable to maintain the connection as the wireless nodes 102 move throughout the coverage region and the loading on the fixed-site nodes 204 varies. In one configuration of the network 100, the fixed-site nodes 204 may be distributed throughout a wireless wide area network (WWAN) covering a municipality or large geographic region. In another configuration of the network 100, the fixed-site nodes 204 may be distributed throughout a wireless local area network (WLAN) in a home, office building, airport, hotel, coffee shop, or other suitable private or public locale. The geographic reach of the peer-to-peer network 100 may be extended through a wide area network (WAN) 206, such as the Internet or the like. A single fixed-site node 204 may provide a backhaul connection to the WAN 206 for the other wireless nodes 102, as shown, or alternatively, any combination of wireless nodes 102 and fixed-site nodes 204 may provide the backhaul.

Figure 3A:
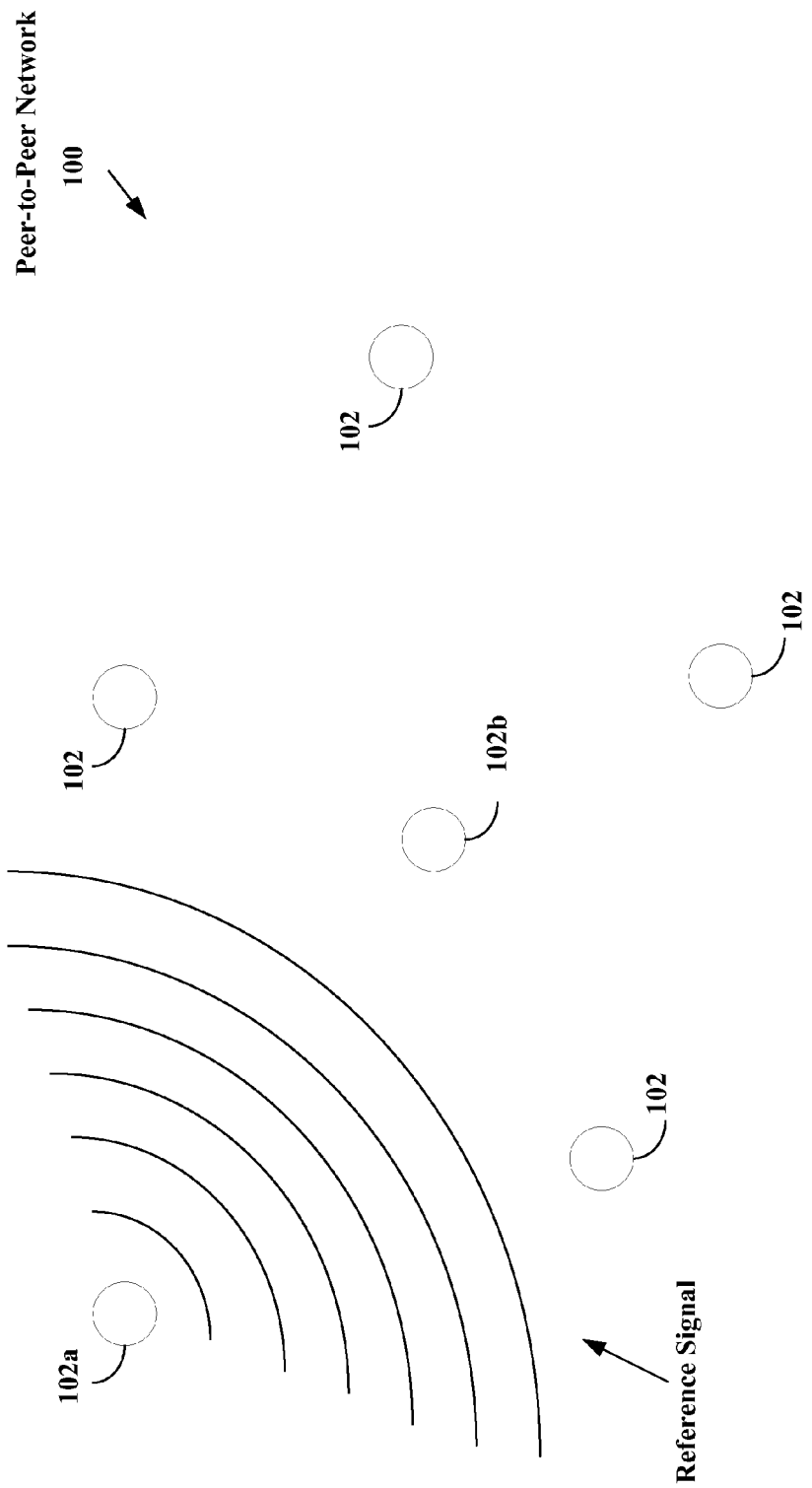
FIG. 3A is a conceptual diagram of yet another exemplary peer-to-peer wireless network illustrating a wireless node broadcasting a reference signal.

The wireless nodes 102 in the peer-to-peer network 100 implement various acquisition procedures to establish wireless links with other wireless nodes 102. Turning to FIG. 3A, a first wireless node 102a may broadcast a reference signal to other wireless nodes in the network 100. The reference signal may include service information, as discussed earlier in the background portion of this disclosure, in addition to "assist information" that may be used by other wireless nodes 102 in the network 100 to determine whether to establish a wireless link with the first wireless node 102a. The assist information may include a portion of a user model or profile stored on the first wireless node 102a. The term "user model" or "user profile" may be used interchangeably. It refers to a model of a user on a wireless node, which is either statically configured or dynamically learned as will be discussed later in this disclosure. The assist information may also include various other information, such as keywords and the like.

Various approaches may be used to create a user model on a wireless node 102. By way of example, a user model may be created using any of the processes or methods disclosed in U.S. Patent Application Publication No. 20090125321 entitled "Methods and Systems for Determining a Geographic User Profile to Determine Suitability of Targeted Content Messages Based on the Profile," U.S. Patent Application Publication No. 20090124241 entitled "Method and System for User Profile Match Indication in a Mobile Environment," U.S. Patent Application Publication No. 20090048977 entitled "User Profile Generation Architecture for Targeted Content Distribution Using External Processes," U.S. Patent Application Publication No. 20090012861 entitled "Method and System for Providing Targeted Information using Profile Attributes with Variable Confidence Levels in a Mobile Environment," U.S. Patent Application Publication No. 20090011744 entitled "Method and System for Delivery of Targeted Information Based on a User Profile in a Mobile Communication Device," and U.S. Patent Application Publication No. 20090011740 entitled "Method and System for Providing Targeted Information based on a User Profile in a Mobile Environment," the contents of each which is incorporated herein by reference in its entirety.

Figure 3B:
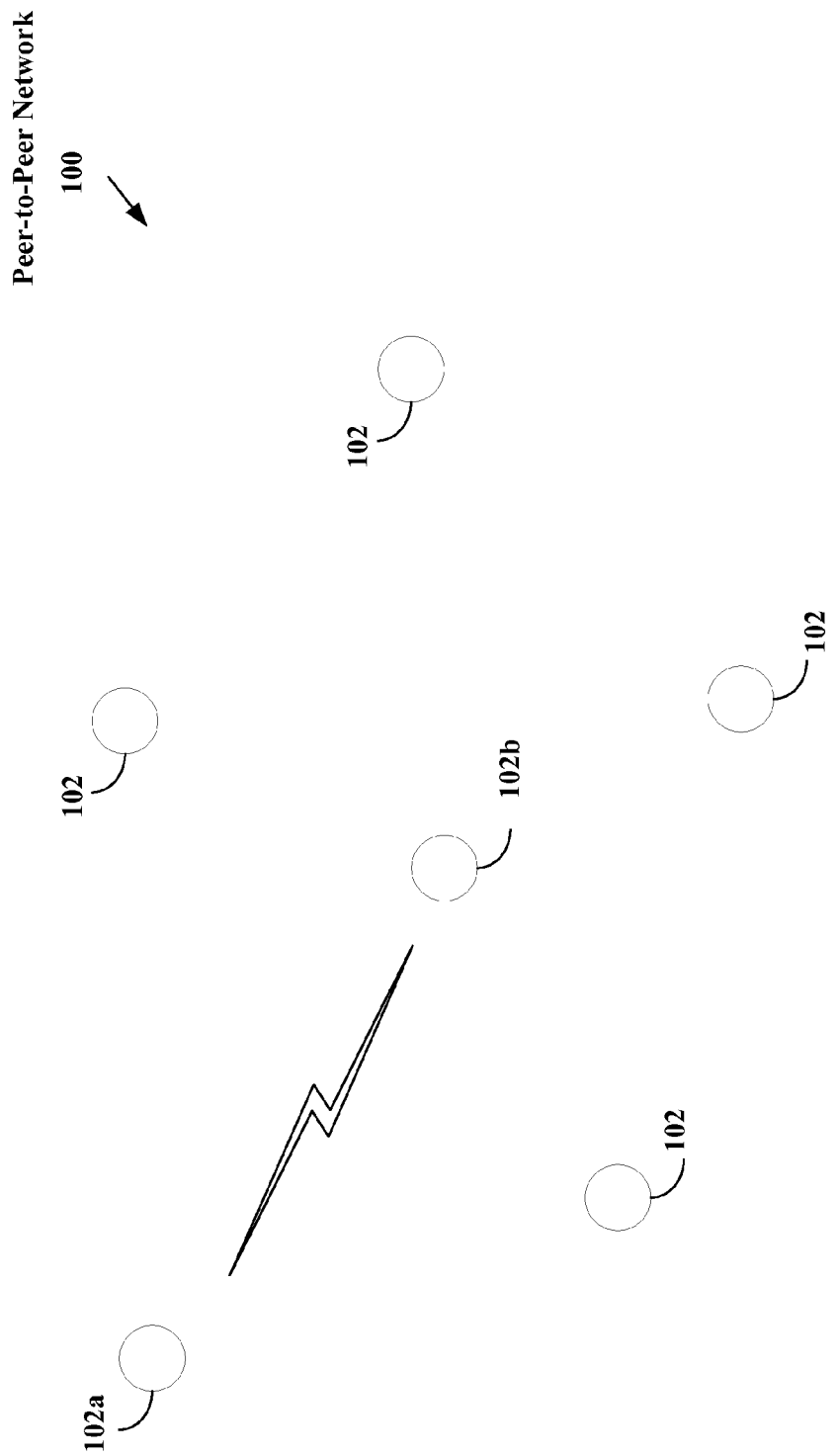
FIG. 3B is a conceptual diagram of the exemplary peer-to-peer wireless network of FIG. 3A illustrating the establishment of a direct wireless link in response to the reference signal.

A second wireless node 102b may decode the reference signal to recover the assist information and correlate the assist information with a user model stored on the second wireless node 102b. The assist information may be correlated with the user model based on certain correlation rules. If the second wireless node 102b determines that there is sufficient correlation between the assist information and its user model, it may implement various acquisition procedures to establish a wireless link with the first wireless node 102a as shown in FIG. 3B. Whether or not the correlation is sufficient may be determined by computing a correlation metric and comparing the computed correlation metric to a threshold value. If the correlation metric exceeds the threshold value, the second wireless node 102b determines that the correlation is sufficient to establish a wireless link.

A simplified example of the correlation process will now be presented. As those skilled in the art will readily appreciate, many other correlation processes of varying complexity may be implemented. By way of example, correlation may be performed by any of the processes or methods disclosed in U.S. Patent Application Publication No. 20090125517 entitled "Method and System for Keyword Correlation in a Mobile Environment," and U.S. Patent Application Publication No. 20090125462 entitled "Method and System using Keyword Vectors and Associated Metrics for Learning and Prediction of User Correlation of Targeted Content Messages in a Mobile Environment," the contents of each which is incorporated herein by reference in its entirety.

Turning to our simplified example, the assist information may comprise several categories including demographic data, key words, and user preferences (e.g., sports, music, movies, politics, etc.). Each category includes one or more parameters. By way of example, the assist information may include the user's age range, five key words, and two user preferences. The assist information may be encoded using a variety of techniques for transmission. In some embodiments the information may be conveyed in a consolidated or compressed form using one or more techniques, e.g., index values, flags, bit vectors, hashes, Bloom filters, etc. The assist information broadcast from the first wireless node 102a is received by the second wireless node 102b and compared to the locally stored user model. The correlation rules may require the second wireless node 102b to compute a correlation metric indicating whether the age ranges are the same and how many keyword and user preferences match. The threshold value may be used to determine whether the correlation metric is sufficient to establish a link.

The correlation rules may be broadcast by the first wireless node 102a along with the assist information, or retrieved elsewhere by the second wireless node 102b. Alternatively, the correlation rules may be stored at the second wireless node 102b. The threshold value may also be broadcast by the first wireless node 102a along with the assist information, or retrieved elsewhere by the second wireless node 102b, or stored at the second wireless node 102b. If a threshold value is broadcast by the first wireless node 102a, the threshold value used by the second wireless node 102b could be the maximum of the two values. Alternatively, the second wireless node 102b may ignore the locally stored threshold value and use the one broadcast by the first wireless node 102a to determine whether to establish a wireless link.

Figure 4A:
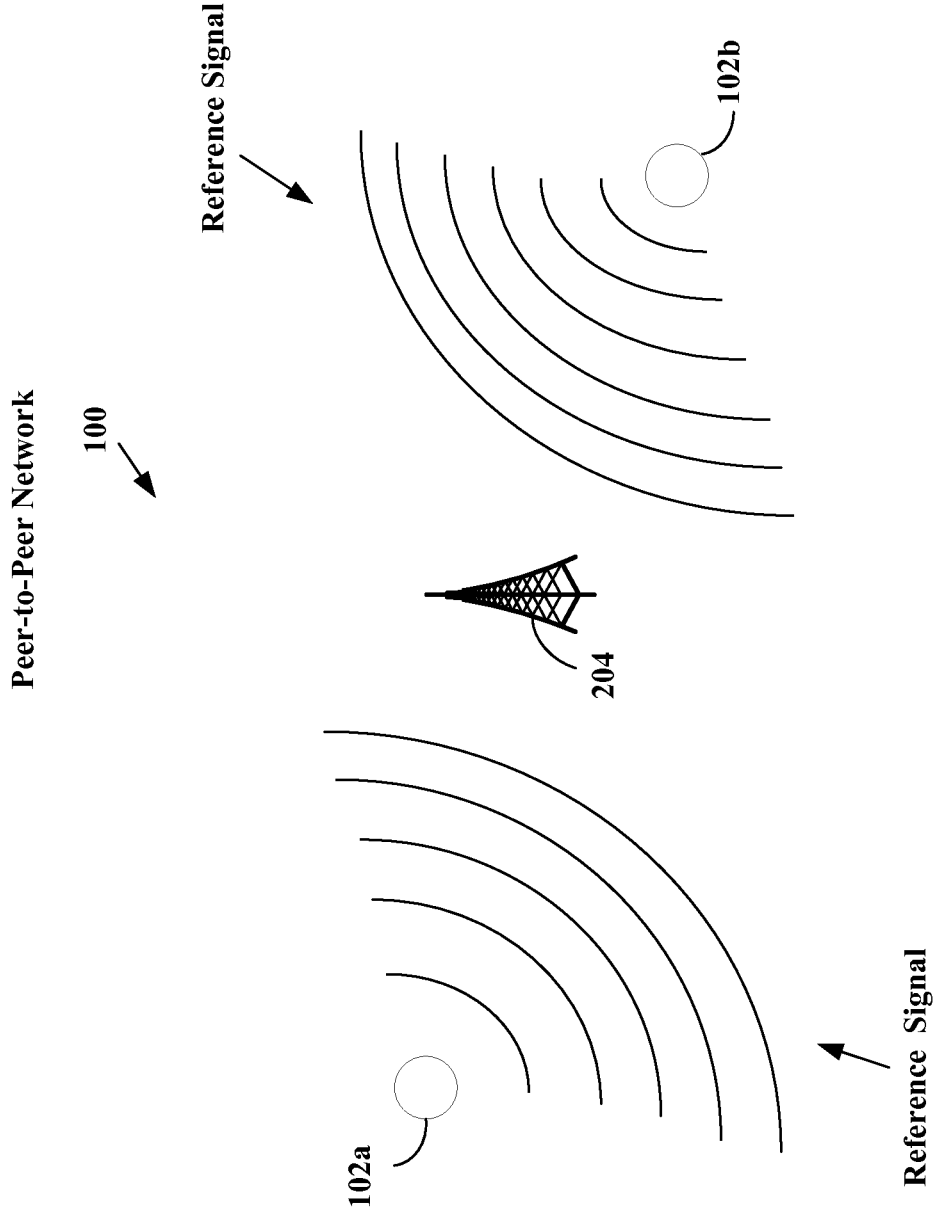
FIG. 4A is a conceptual diagram of yet another exemplary peer-to-peer wireless network illustrating two wireless nodes broadcasting a reference signal.
Figure 4B:
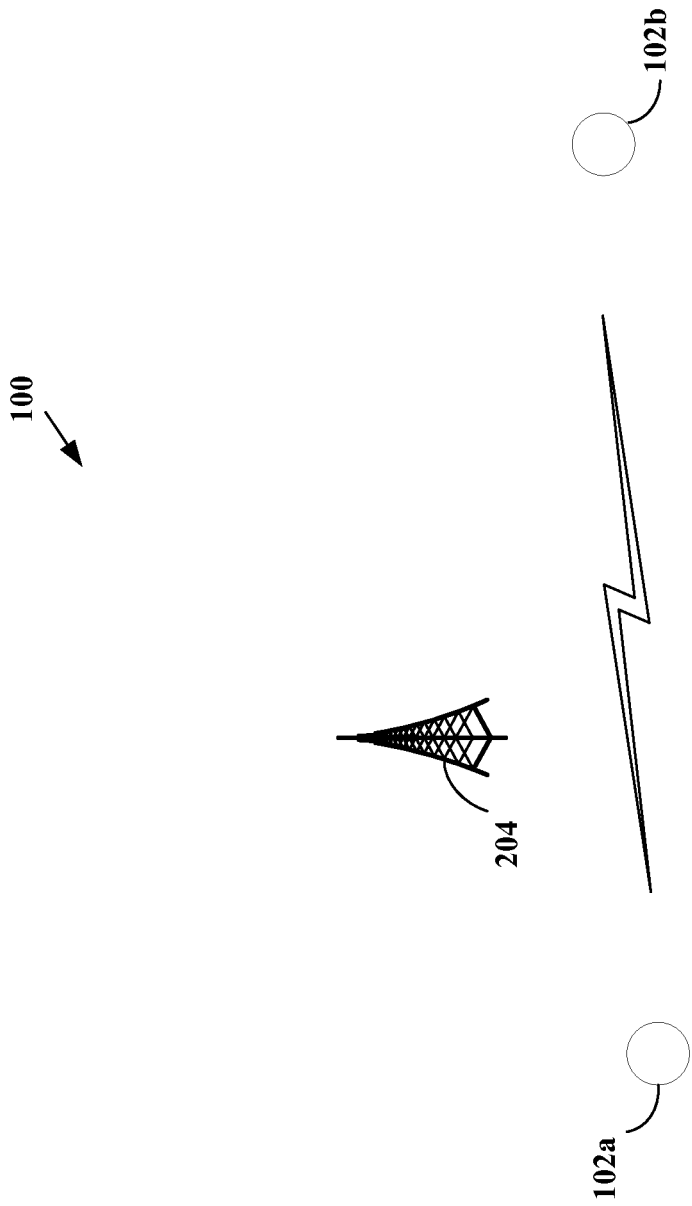
FIG. 4B is a conceptual diagram of the exemplary peer-to-peer wireless network of FIG. 4A illustrating the establishment of a direct wireless link in response to the reference signal.
Figure 4C:
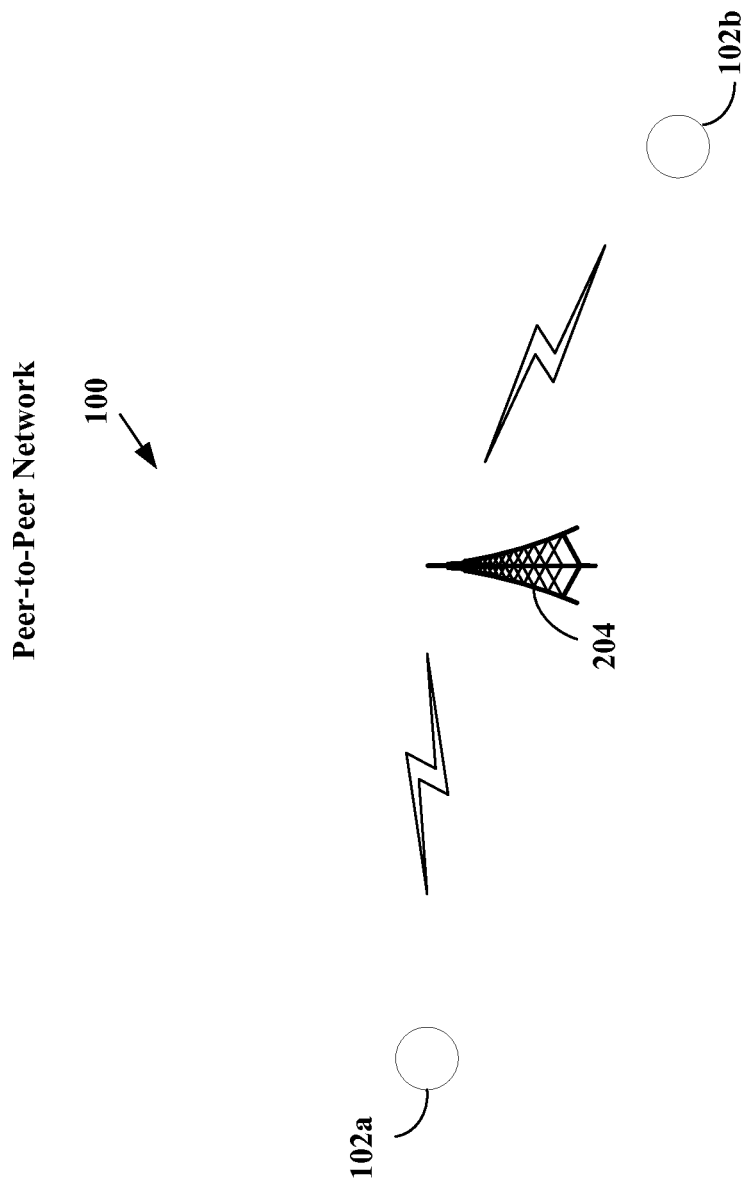
FIG. 4C is a conceptual diagram of the exemplary peer-to-peer wireless network of FIG. 4A illustrating the establishment of an indirect wireless link in response to the reference signal.

Alternatively, the acquisition procedures may be assisted by an intermediary node remote to the first and second wireless nodes. In the following examples, the intermediary node will be described as a fixed-site wireless node. However, as those skilled in the art will readily appreciate, the intermediary node could be a mobile wireless node. Turning to FIG. 4A, a fixed-site wireless node 204 may be used to perform a mutual correlation process. In this example, the fixed-site wireless node 204 decodes the reference signals broadcast by the first and second wireless nodes 102a, 102b to recover the assist information for each. The fixed-site wireless node 204 then correlates the assist information from both nodes to determine whether a wireless link should be established between the two. If the fixed-site wireless node 204 determines that there is sufficient correlation based on the appropriate correlation rules and threshold value, it then signals at least one of the first and second wireless nodes 102a, 102b. In response to this signaling, the first and/or second wireless nodes 102a, 102b implement various acquisition procedures to establish a wireless link as shown in FIG. 4B. Alternatively, the fixed-site wireless node 204 may use the same access mechanisms to establish a wireless link with each of the first and second wireless nodes 102a, 102b, and then provide a relay function to establish an indirect connection between the first and second nodes 102a, 102b as shown in FIG. 4C.

In another example of an intermediary remote node, the fixed-site wireless node 204 may perform a transitive correlation process. In this example, the fixed-site wireless node 204 performs a first correlation between the assist information from the first wireless node 102a and a user model stored on the fixed-site node 204. In this example, the fixed-site node 204 performs a second correlation between the assist information from both nodes only if the correlation metric for the first correlation is sufficient given the current correlation rules. The fixed-site wireless node 204 determines whether the second correlation is sufficient for establishing a wireless link between the first and second wireless nodes 102a, 102b. In a manner similar to that described earlier, the wireless link may be established directly between the first and second nodes 102a, 102b is using various acquisition procedures in response to signaling from the fixed-site node 204, or alternatively, the wireless link may be established indirectly through the fixed-site wireless node 204.

Regardless of the acquisition procedure, once a wireless link is established between two wireless nodes, they may continue correlating information to determine whether the wireless link should be maintained. The ability to further correlate information once the wireless link is established is particularly useful because the amount of assist information that can be broadcast in the reference signal may be limited. By way of example, the assist information may be limited to basic demographic data and/or a few key words. Once a wireless connection is established based on the correlation of the assist information, a cross-layer trigger from the link layer to the application layer may be used to enable the transfer of additional peer-to-peer information between the two nodes to determine whether the wireless link should be maintained. The additional information may include more comprehensive demographics, additional key words, user preferences, user behavior, and other relevant information.

The acquisition procedures described thus far may be well suited for many applications. An example is a wireless personal area network (WPAN) comprising a group of peer nodes owned by a user. In this example, the user model for each node in the WPAN may include a list of all wireless nodes in WPAN. In this example, a wireless node coming on line may broadcast a reference signal with assist information identifying itself. Each wireless node receiving the broadcast, recovers the assist information and correlates it against the list contained in the locally stored user model to determine whether it belongs to the same user WPAN as the broadcasting node. If a wireless node correlates the assist information received in the reference signal broadcast with its user model, it then employs various acquisition procedures to establish a wireless link with the broadcasting node. This concept may be extended to peer node groups within a WLAN or WWAN. By way of example, the user model for each node in the group may include a user model that list all wireless nodes belonging to employees of a company, members of a club, subscribers of a service from a particular provider (e.g., gaming, dating, shopping, etc.), friends (e.g., buddy list), armed forces personnel engaged in battle, or any other suitable group.

As mentioned above, wireless links may be established between nodes based on demographics. By way of example, a wireless link may be established between two wireless nodes based on the geographic location (e.g., ZIP code), gender, age, profession, household income, household size, marital status, homeowner, etc. of the users, or any combination thereof Various demographic data and key words may be included in the assist information broadcast in the reference signal by one of the wireless nodes. The assist information may be recovered by another wireless node and correlated with the locally stored user model based on a threshold correlation value.

In addition to demographics, as mentioned above, wireless links may be established between nodes based on user behavior and preferences. A user model may be created manually by the user and/or dynamically by monitoring the usage of various applications on the wireless node. The latter may be achieved by monitoring which applications a user launches and how he or she interacts with the applications. By way of example, a wireless link may be established between two nodes whose users have similar musical interests or enjoy playing the same games. The type of user preference and behavioral information that may be included in the assist information includes, by way of example, keywords, songs played, websites visited, games played, e-commerce transactions, etc.

The user model information stored on the wireless nodes may also be used to deliver targeted content information based on the user model stored on each wireless node. Turning to FIG. 5A, a WWAN 206 may be used to broadcast metadata with targeted content messages. The metadata identifies the content and demographics of the target audience for the message. By way of example, the metadata may indicate that the message is directed to sports and the target demographics are male adult sports fans. Alternatively, the metadata may indicate that the message is directed to financial news, politics, religion, weather, road conditions, entertainment, etc. and the target demographics may include age, gender, occupation, income, residence, hobbies, etc.

A first wireless node 102a in the network 100 may use the metadata to select target content messages. More particularly, the first wireless node 102a may correlate the metadata for a targeted content messages with its locally stored user model and select the messages with sufficient correlation using the appropriate correlation rules and threshold values. The selected messages may be presented to a user interface (e.g., display) on the wireless node 102a. Alternatively, or in addition to, the selected messages may be stored in cache for later presentation to the user via the user interface.

The metadata may be stored in cache by the first wireless node 102a along with the targeted content messages. The metadata may then be used by the first wireless node 102a to deliver target content messages to other nodes in the network. In one configuration of a wireless network, the network operator for the WWAN 206 can provide financial incentives to the first wireless node 102a for forwarding the targeted content message. By way of example, the network operator may provide wireless nodes willing to provide a conduit to other wireless nodes for targeted content messages with discounted wireless services. The revenue generated by the network operator through targeted content messages (e.g., advertisements) forwarded by wireless nodes may allow the network operator to provide services to those wireless nodes without paying the full subscription price usually associated with such services.

Figure 5B:
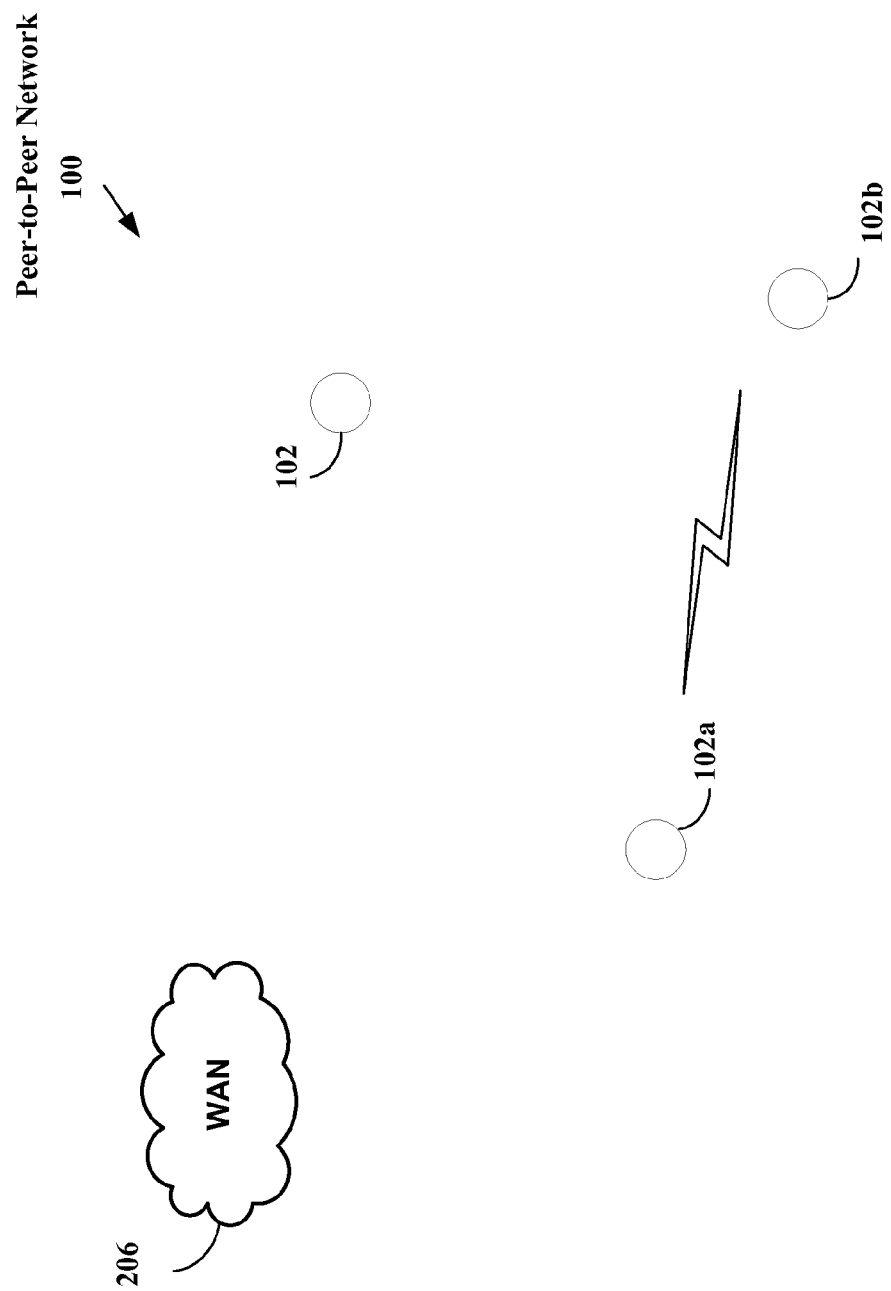
FIG. 5B is a conceptual diagram of the exemplary peer-to-peer wireless network of FIG. 5A illustrating the establishment of a wireless link in response to the reference signal.

The manner in which targeted content messages may be delivered by the first wireless node 102a may vary. By way of example, a second wireless node 102b may broadcast a reference signal containing assist information as shown in FIG. 5A. The first wireless node 102a may recover the assist information from the broadcast and correlate the assist information with its locally stored user model based on the appropriate correlation rules and threshold values, as described earlier. If the first wireless node 102a determines that there is sufficient correlation between the assist information and its user model, it may then correlate the assist information recovered from the reference signal broadcast by the second wireless node 102b with the metadata stored by the first wireless node 102a. Various correlation rules and threshold values may also be used to perform this correlation. If the first wireless node 102a determines that there is sufficient correlation between the assist information and metadata for targeted content messages, various acquisition procedures to establish a wireless link with the second wireless node 102b to deliver the relevant metadata, as shown in FIG. 5B. The second wireless node 102b provides to the first wireless node 102a a subset of the metadata that it desires by correlating it with its locally stored user model. The first wireless node 102a then sends the targeted content messages corresponding to the subset of metadata received from the second wireless node 102b.

Alternatively, the first wireless node 102b may correlate the assist information recovered from the reference signal broadcast by the second wireless node 102b with the stored metadata regardless of whether or not the assist information correlates with the first wireless node's locally stored user model. If the first wireless node 102a determines that there is sufficient correlation between the assist information and metadata for targeted content messages, based on various correlation rules and threshold values, a wireless link may be established with the second wireless node 102b to deliver the relevant metadata. The second wireless node 102b provides to the first wireless node 102a a subset of the metadata that it desires by correlating it with its locally stored user model. The first wireless node 102a then sends the targeted content messages corresponding to the subset of metadata received from the second wireless node 102b.

In the preceding examples, targeted content messages are pushed from the WWAN 206, and then delivered to the second wireless node 102b from the first wireless node 102a based on a correlation match. Alternatively, the target content messages may be pulled from the WWAN 206 following a correlation match between the first and second wireless nodes 102a, 102b. In this example, the second wireless node 102b broadcasts a reference signal containing assist information. The first wireless node 102a recovers the assist information from the broadcast and correlates the assist information with its locally stored user model based on the appropriate correlation rules and threshold values, as described earlier. If the first wireless node 102a determines that there is sufficient correlation between the assist information and its user model, it may then correlate the assist information recovered from the reference signal broadcast by the second wireless node 102b with metadata for targeted content messages broadcast by the WWAN 206. If the first wireless node 102a determines that there is sufficient correlation between the assist information and metadata, various acquisition procedures to establish a wireless link with the second wireless node 102b to deliver the relevant metadata. The second wireless node 102b provides to the first wireless node 102a a subset of the metadata that it desires by correlating it with its locally stored user model. The first wireless node 102a then retrieves from the WWAN 206 the targeted content messages corresponding to the subset of metadata and provides the targeted content messages to the second wireless node 102b over the wireless link.

Alternatively, the first wireless node 102b may correlate the assist information recovered from the reference signal broadcast by the second wireless node 102b with the metadata for targeted content messages broadcast by the WWAN 206, regardless of whether or not the assist information correlates with the first wireless node's locally stored user model. If the first wireless node 102a determines that there is sufficient correlation between the assist information and metadata for targeted content messages, a wireless link may be established with the second wireless node 102b to deliver the relevant metadata. The second wireless node 102b provides to the first wireless node 102a a subset of the metadata that it desires by correlating it with its locally stored user model. The first wireless node 102a then retrieves from the WWAN 206 the targeted content messages corresponding to the subset of metadata and provides the targeted content messages to the second wireless node 102b over the wireless link.

Figure 6:
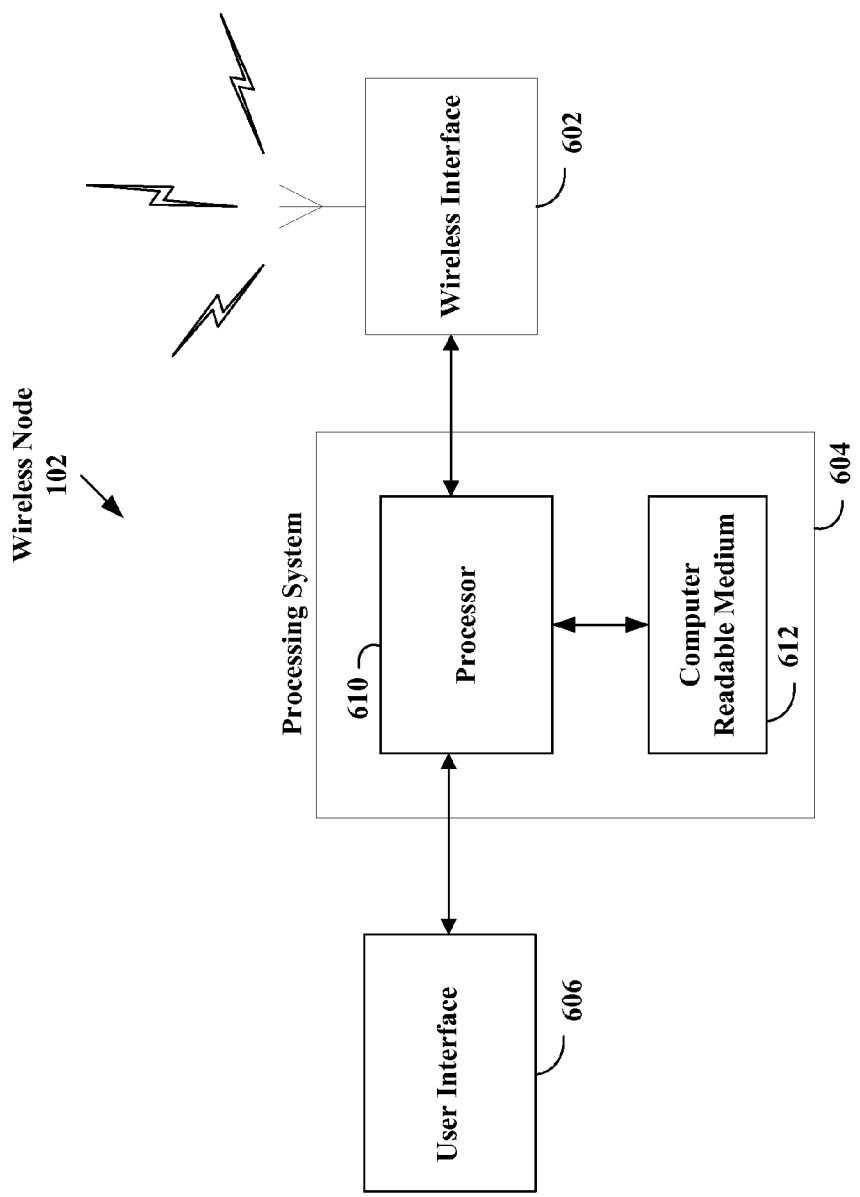
FIG. 6 is a conceptual diagram illustrating an example of a hardware configuration for a wireless node.

FIG. 6 is a conceptual illustrating an example of a hardware configuration for a wireless node 102. In this example, the wireless node 102 is shown with a user interface 606 (e.g., a keypad, display, speaker, microphone, joystick, and/or any other combination user interface devices), a processing system 604, and a wireless interface 602. The processing system 604 may have one or more processors represented generally by processor 610 and a computer readable medium (e.g., memory) 612.

The processor system 604 may be implemented using software, hardware, or a combination of both. By way of example, the processor 610 may be implemented with one or more, or any combination of, microprocessors, digital signal processors (DSP), application specific integrated circuits (ASIC), microcontrollers, programmable logic, state machines, discrete gates, transistor logic, discrete hardware components, or some other processing entity designed to perform the various functions presented throughout this disclosure. Those skilled in the art will recognize how best to implement the described functionality for the processing system 604 depending on the particular application and the overall design constraints imposed on the overall system.

Various configurations of the processing system may include one or more processors capable of executing software. Software shall be construed broadly to mean instructions, data, or any combination thereof, whether referred to as software, firmware, middleware, microcode, hardware description language, or otherwise. Software may be stored on computer readable medium 612, which may be implemented with RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof The computer readable medium may be embodied in a computer product. The computer product may comprise packaging materials.

In the conceptual illustration presented in FIG. 6, the computer readable medium 612 is shown as part of the processing system 604 separate from the processor 610. However, as those skilled in the art will readily appreciate, the computer readable medium 612, or any portion thereof, may be external to the processing system 604. By way of example, the computer readable medium 612 may include a transmission line, a carrier wave modulated by data, and/or a computer product separate from the wireless node 102, all which may be accessed by the processor 610 through the wireless interface 602 or by some other means. Alternatively, or in addition to, the computer readable medium 612, or any portion thereof, may be integrated into the processor 610, such as the case may be with cache and/or general register files.

The wireless interface 602 may provide a transmitting and/or a receiving function. The transmitting function modulates a carrier with data for transmission over the wireless medium and the receiving function demodulates a carrier received over the wireless medium to recover data. The wireless interface 602 may also provide various other functions, such as RF front-end processing, analog/digital conversion, timing and frequency estimation, channel estimation, modulation coding scheme (MCS), etc. In summary, the wireless interface 602 may be configured to provide the complete physical layer implementation for a particular air interface protocol. The implementation is well within the capabilities of one skilled in the art.

The processor 610 provides general processing functions, including the execution of software stored on the computer readable medium 612. The software includes instructions that when executed by the processor 610 cause the processing system 604 to perform the various functions presented throughout this disclosure. In the most general terms, the processing system 604 is configured to implement all functionality above the physical layer, however, as those skilled in the art will appreciate, various functions above the physical layer may also be implemented in the wireless interface 602. Moreover, various physical layer functions described above as being implemented by the wireless interface 602 may be implemented by the processing system 604.

Figure 7:
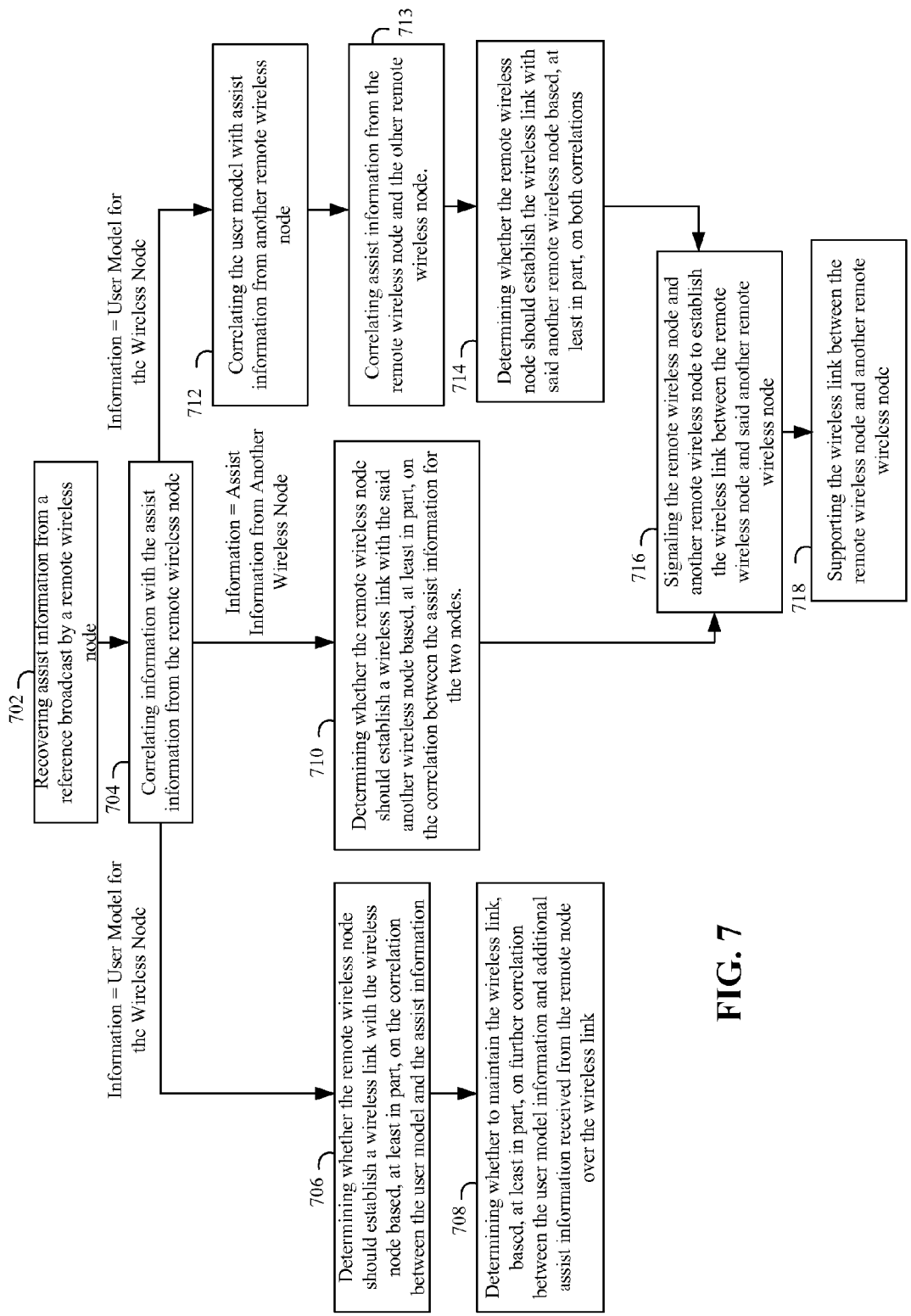
FIG. 7 is a flow chart illustrating an example of a process implemented by a wireless node to determine whether to establish a wireless link.
Figure 8:
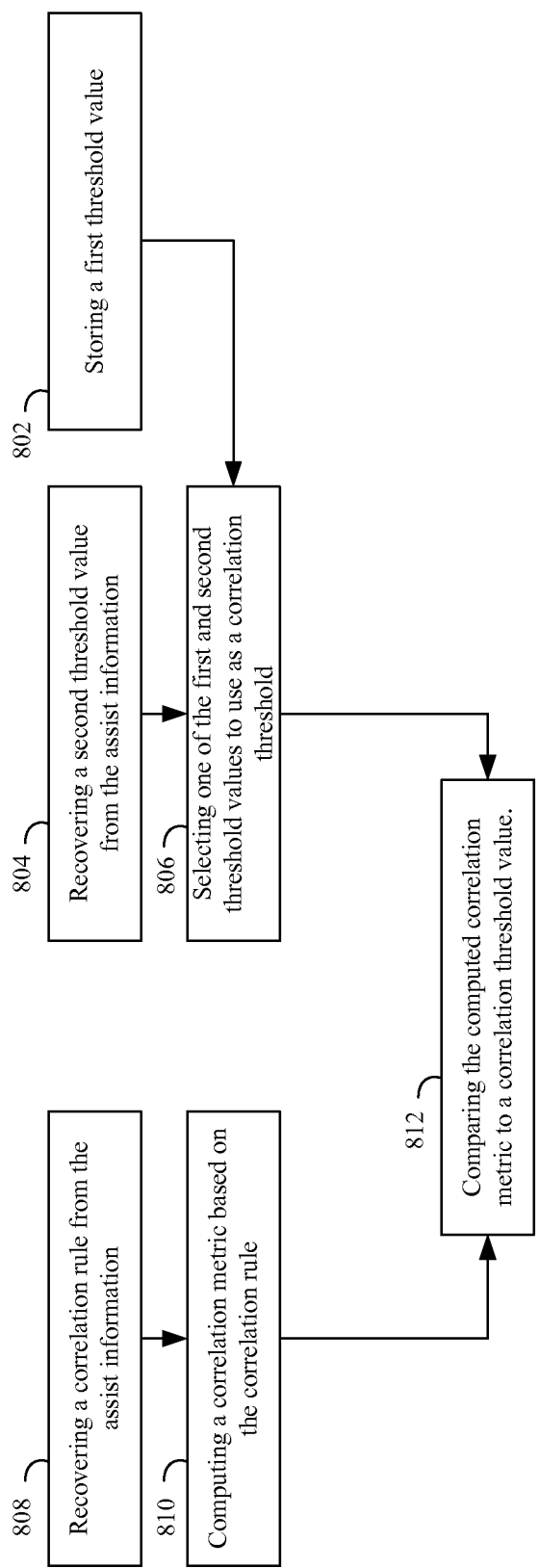
FIG. 8 is a flow chart illustrating an example of a correlation process implemented by the wireless as part of the process described in connection with FIG. 7.
Figure 9:
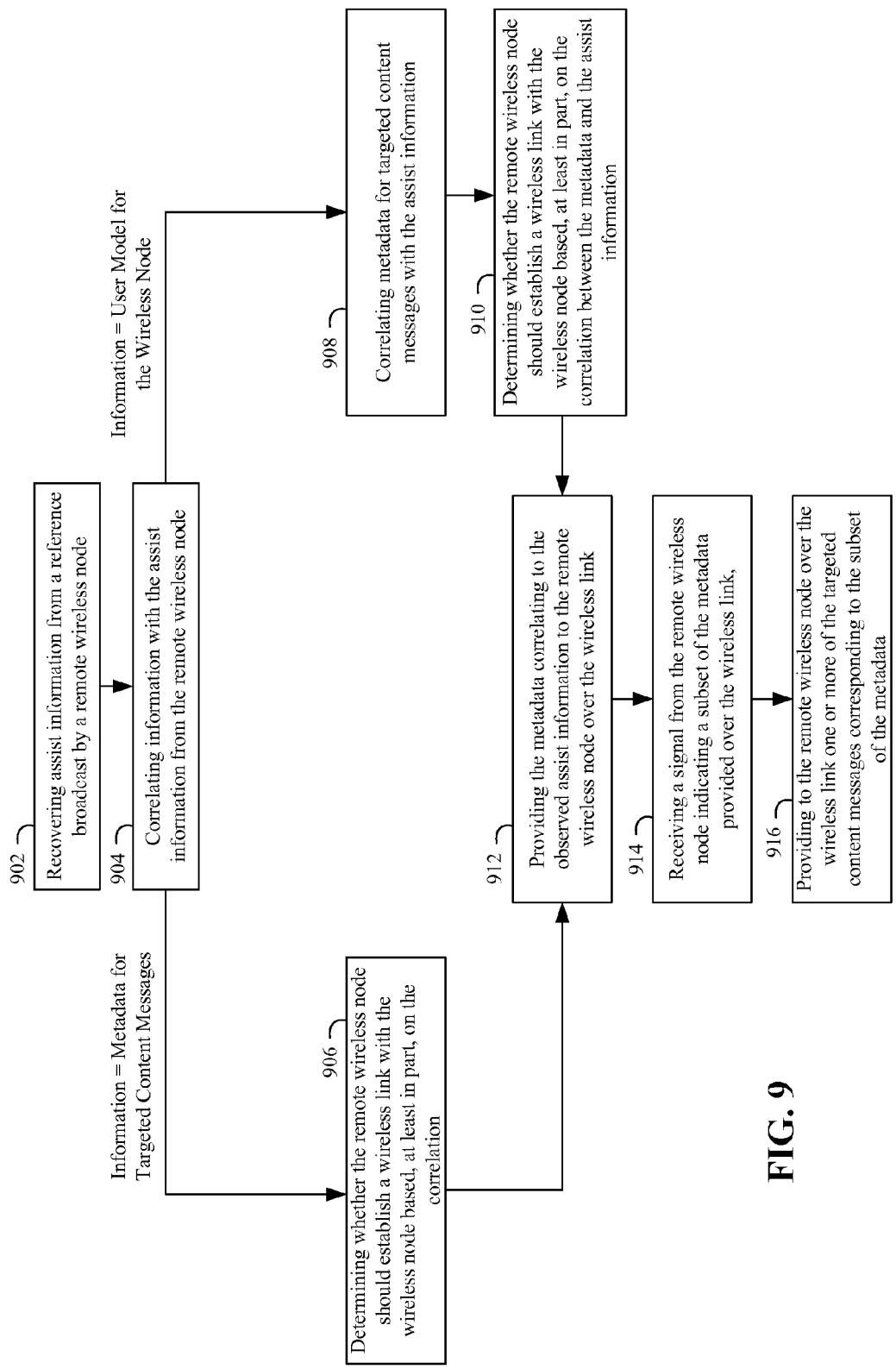
FIG. 9 is a flow chart illustrating an example of a process implemented by a wireless node to deliver targeted content messages.

Examples of various functions that may be implemented by the processing system in software will now be presented with reference to FIGS. 7-9.

Referring to FIG. 7, the processing system may be used to enable a wireless node to establish a wireless link with a remote wireless node. Alternatively, or in addition to, the processing system may be used to facilitate the establishment of a wireless link between two remote wireless nodes. In both cases, assist information may be recovered from a reference signal broadcast by a remote wireless node in step 702, and information may be correlated with the assist information in step 704.

In the case where the processing system is used to enable the wireless node to establish a wireless link with a remote wireless node, the information comprises a user model for the wireless node. In this case, the processing system determines whether the remote wireless node should establish a wireless link with the wireless node based, at least in part, on the correlation between the user model and the assist information in step 706. The processing system may also determine whether to maintain the wireless link based, at least in part, on further correlation between the user model and additional assist information received from the remote node over the wireless link in step 708.

In the case where the processing system is used to enable the wireless node to facilitate the establishment of a wireless link between a remote wireless node and another remote wireless node, the information may be either user model information for the wireless node or assist information from the other remote wireless node. In the latter case, the processing system determines whether the remote wireless node should establish a wireless link with the other remote wireless node based, at least in part, on the correlation between the assist information for the remote wireless node and the assist information for the other remote wireless node in step 710. In the former case, the processing system correlates the user model with the assist information from the other remote wireless node in step 712, and determines whether the remote wireless node should establish a wireless link with the other wireless node based on both correlations in step 714.

If the processing system determines that a wireless link should be established between the remote wireless node and the other remote wireless node, the processing system signals both nodes to establish the link in step 716. Once established, the processing system supports the wireless link between the two in step 718.

An example of a correlation processing system will now be presented with reference to FIG. 8. In this example, the processing system stores a first threshold value in step 802, recovers a second threshold value from the assist information in step 804, and selects one of the first and second threshold values to use as a correlation threshold in step 806. The processing system also recovers a correlation rule from the assist information in step 808, computes a correlation metric based on the correlation rule in step 810, and compares the computed correlation metric to the correlation threshold value in step 812. The success of the correlation is determined by the comparison.

The processing system may also be used to deliver targeted content information to other wireless nodes. Turning to FIG. 9, assist information may be recovered from a reference signal broadcast by a remote wireless node in step 902, and information may be correlated with the assist information in step 904. In one configuration, the information is metadata for targeted content messages, and the processing system determines whether to establish a wireless link based, at least in part, on the correlation between the metadata and the assist information in step 906. In another configuration, the information is a user model for the wireless node, and the processing system correlates the metadata for the targeted content messages with the assist information in step 908 if the correlation between the user model and the assist information is successful in step 904. The processing system determines whether the remote wireless node should establish the wireless link with a wireless node based, at least in part, on the correlation between the metadata and the assist information in step 910. Should a wireless link be established, the processing system provides the metadata correlating to the assist information to the remote wireless node over the wireless link in step 912, receives a signal from the remote wireless node indicating a subset of the metadata provided over the wireless link in step 914, and provides to the remote wireless node over the wireless link one or more of the targeted content messages corresponding to the subset of the metadata in step 916.

It is understood that any specific order or hierarchy of steps described in the context of software is being presented to provide an examples of a wireless node. Based upon design preferences, it is understood that the additional steps may be added and/or some steps may be deleted. In addition, the specific order or hierarchy of steps may be rearranged.

Although various aspects of a wireless node have been described as software implementations, those skilled in the art will readily appreciate that the various software processes presented throughout this disclosure may be implemented in hardware, or any combination of software and hardware. Whether these aspects are implemented in hardware or software depends upon the particular application and design constraints imposed on the overall system. Skilled artisans may implement the described functionality in varying ways for each particular application.

Figure 10:
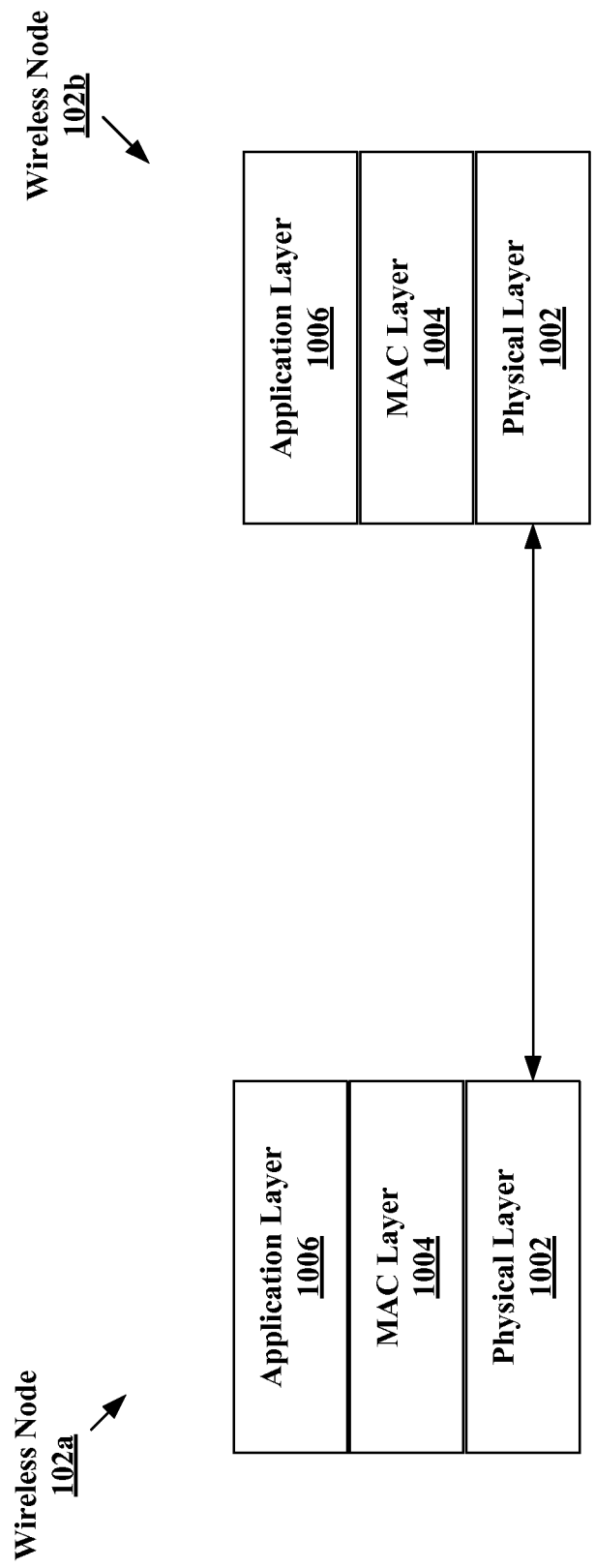
FIG. 10 is a conceptual diagram illustrating an example of a protocol stack for a wireless node.

FIG. 10 is a conceptual diagram illustrating an exemplary protocol stack for first and second wireless nodes in a network. The first wireless node 102a includes a physical layer 1002, a MAC layer 1004 and an application layer 1006. Similarly, the second wireless node 102b includes a physical layer 1002, a MAC layer 1004, and an application layer 1006. Depending on the particular application and overall design constraints imposed on the system, the protocol stack may include additional layers.

In one configuration of a first wireless node 102a, the MAC layer 1004 may be used to generate the reference signal. As explained in detail above, the reference signal may include assist information, and in some cases, correlation rules and/or threshold values. The reference signal may contain a MAC packet having a MAC header and a MAC payload. A bit or field in the MAC header may be used to extend the MAC payload to include assist information, correlation rules and/or threshold values. The assist information, correlation rules, and/or threshold values may be included at the end of the MAC payload, or elsewhere in the MAC packet. A set of bits or field, e.g., at the beginning of the assist information, may be used to indicate the number of bytes occupied by the assist information. The same scheme may be used to indicate the number of bytes occupied by the correlation rules and threshold values. The MAC packet may be provided to the physical layer 1002 for processing before being broadcast into the network.

The second wireless node 102b receives the broadcast, performs processing at the physical layer 1002 to recover the MAC packet, and provides the MAC packet to the MAC layer 1004. If the MAC header indicates an extended payload with assist information, correlation rules, and/or threshold values, this data is recovered from the MAC packet and provided to the application layer 1006 for correlation with a user model (or metadata) stored in computer readable medium 612 (see FIG. 6). As discussed earlier, the user model may be programmed into the wireless node 102b, entered via the user interface 606 (see FIG. 6), and/or dynamically created by data mining software that executes in the application layer 1006 to monitor application usage and internet traffic (e.g., websites visited, e-commerce transactions, etc.). Alternatively, the data mining software may be executed below the application layer 1006, for example, in the network layer (not shown), and/or included in the code for the various applications launched by the user. In any event, if the second wireless node 102b determines that the correlation is sufficient, various MAC layer protocols may be used to establish a wireless link. A cross-layer trigger from the MAC layer 1004 to the application layer 1006 may be triggered to enable peer-to-peer communications, either to perform further correlation or communicate.

Figure 11:
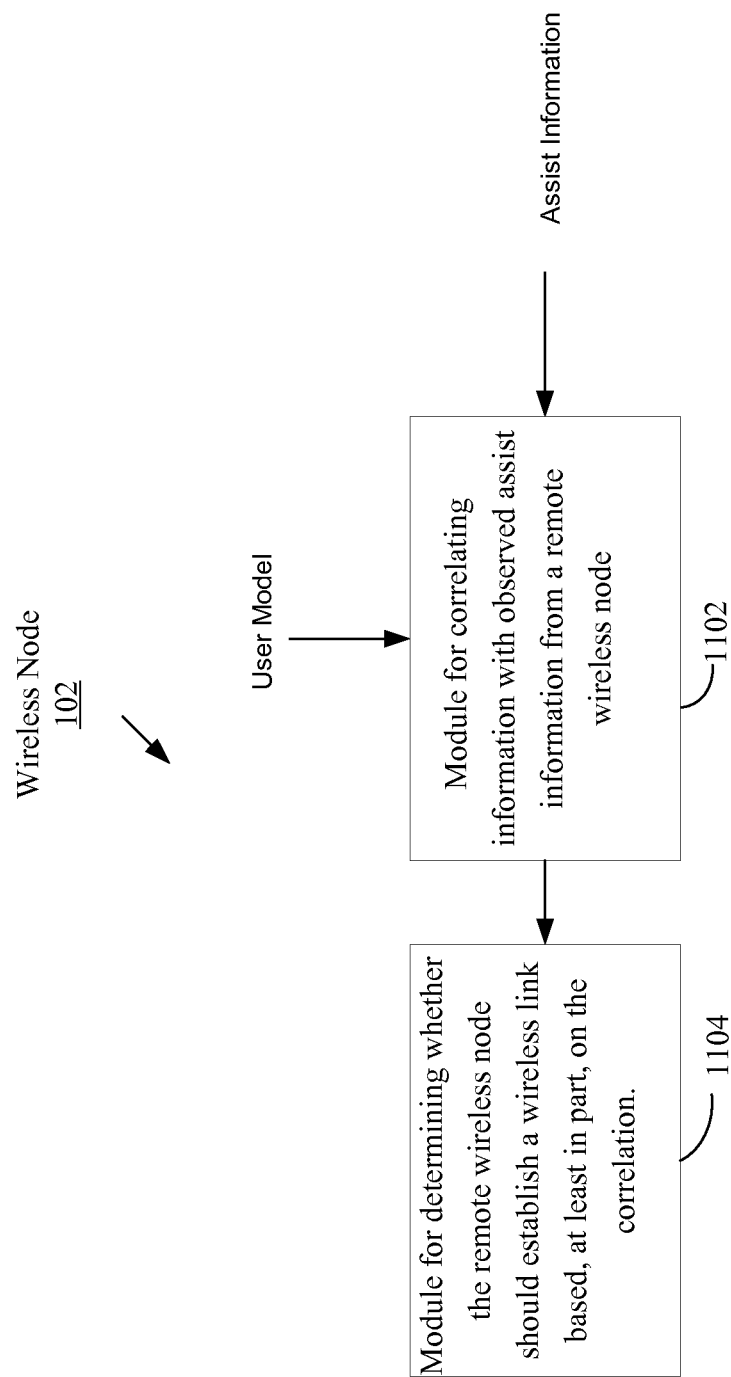
FIG. 11 is a conceptual diagram illustrating an example of the functionality of a wireless node.

FIG. 11 is a conceptual diagram illustrating an example of the functionality of a wireless node. The wireless node includes a module 1102 for correlating information with observed assist information from a remote wireless node, and a module 1104 for determining whether the remote wireless node should establish a wireless link based, at least in part, on the correlation.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A wireless node, comprising:
   a processing system configured to:
   store a first threshold value;
   recover a second threshold value from observed assist information;
   select one of the first and second threshold values as a correlation threshold value;
   correlate information with the observed assist information from a remote wireless node by computing a correlation metric based on a correlation rule and comparing the computed correlation metric to the correlation threshold value, the information comprising a user model for the wireless node; and
   determine whether the remote wireless node should establish a wireless link based, at least in part, on the correlation.

2. The wireless node of claim 1, wherein the processing system is further configured to determine whether the remote wireless node should establish the wireless link with the wireless node.

3. The wireless node of claim 1, wherein the information comprises observed assist information from another remote wireless node, and wherein the processing system is further configured to determine whether the remote wireless node should establish the wireless link with said another remote wireless node.

4. The wireless node of claim 1, wherein the processing system is further configured to correlate the information with observed assist information from another remote wireless node, the processing system being further configured to determine whether the remote wireless node should establish the wireless link with said another remote wireless node based, at least in part, on the correlation of the information with the observed assist information from said another remote wireless node.

5. The wireless node of claim 4, wherein the processing system is further configured to correlate the observed assist information from the remote wireless node and said another remote wireless node if the information correlates with the observed assist information from the said another remote wireless node, the processing system being further configured to determine whether the remote wireless node should establish the wireless link with said another remote wireless node based, at least in part, on the correlation of the observed assist information from the remote wireless node and said another remote wireless node.

6. The wireless node of claim 1, wherein the processing system is further configured to support the wireless link between the remote wireless node and another remote wireless node.

7. The wireless node of claim 1, wherein the processing system is further configured to signal the remote wireless node and another remote wireless node to establish the wireless link between the remote wireless node and said another remote wireless node.

8. The wireless node of claim 1, wherein the processing system is further configured to recover the observed assist information from a reference broadcast by the remote wireless node.

9. The wireless node of claim 1, wherein the observed assist information comprises a portion of the user model for the remote wireless node.

10. The wireless node of claim 1, wherein the processing system is further configured to recover the correlation rule from the assist information.

11. The wireless node of claim 1, wherein the processing system is further configured to recover the correlation threshold value from the assist information.

12. The wireless node of claim 1, wherein if the wireless link is established between the remote wireless node and the wireless node, the processing system is further configured to determine whether to maintain the wireless link based, at least in part, on further correlation between the information and additional assist information received from the remote wireless node over the wireless link.

13. The wireless node of claim 1, wherein the user model comprises user demographics and preferences.

14. The wireless node of claim 1, wherein the user model comprises key words.

15. The wireless node of claim 1, wherein the processing system is further configured to create and maintain the user model based, at least in part, on user behavior.

16. The wireless node of claim 1, wherein the information comprises metadata for a plurality of targeted content messages.

17. The wireless node of claim 1, wherein the processing system, if the observed assist information correlates with the user model, is further configured to correlate metadata for a plurality of targeted content messages with the observed assist information, the processing system being further configured to determine whether to establish the wireless link based, at least in part, on the correlation between the metadata and the observed assist information.

18. The wireless node of claim 1, wherein the information comprises metadata for a plurality of targeted content messages, or the processing system is further configured to correlate metadata for a plurality of targeted content messages with the observed assist information following the correlation of the information with the observed assist information, wherein, if the processing system determines to establish the wireless link, the processing system is further configured to provide the metadata correlating to the observed assist information to the remote wireless node over the wireless link.

19. The wireless node of claim 18, wherein the processing system is further configured to receive a signal from the remote wireless node indicating a subset of the metadata provided over the wireless link, and to provide to the remote wireless node over the wireless link one or more of the targeted content messages corresponding to the subset of the metadata.

20. A method of communications at a wireless node, comprising:
storing a first threshold value;
recovering a second threshold value from observed assist information;
selecting one of the first and second threshold values as a correlation threshold value;
correlating information with the observed assist information from a remote wireless node by computing a correlation metric based on a correlation rule and comparing the computed correlation metric to the correlation threshold value, the information comprising a user model for the wireless node; and
determining whether the remote wireless node should establish a wireless link based, at least in part, on the correlation.

21. The method of claim 20, wherein the determination of whether the remote wireless node should establish the wireless link comprises determining whether the remote wireless node should establish the wireless link with the wireless node.

22. The method of claim 20, wherein the information comprises observed assist information from another remote wireless node, and wherein the determination of whether the remote wireless node should establish the wireless link comprises determining whether the remote wireless node should establish the wireless link with said another remote wireless node.

23. The method of claim 20, further comprising correlating the information with observed assist information from another remote wireless node, and wherein the determination of whether the remote wireless node should establish the wireless link comprises determining whether the remote wireless node should establish the wireless link with said another remote wireless node based, at least in part, on the correlation of the information with the observed assist information from said another remote wireless node.

24. The method of claim 23, further comprising correlating the observed assist information from the remote wireless node and said another remote wireless node if the information correlates with the observed assist information from the said another remote wireless node, and wherein the determination of whether the remote wireless node should establish the wireless link comprises determining whether the remote wireless node should establish the wireless link with said another remote wireless node based, at least in part, on the correlation of the observed assist information from the remote wireless node and said another remote wireless node.

25. The method of claim 20, further comprising supporting the wireless link between the remote wireless node and another remote wireless node.

26. The method of claim 20, further comprising signaling the remote wireless node and another remote wireless node to establish the wireless link between the remote wireless node and said another remote wireless node.

27. The method of claim 20, further comprising recovering the observed assist information from a reference broadcast by the remote wireless node.

28. The method of claim 20, wherein the observed assist information comprises a portion of the user model for the remote wireless node.

29. The method of claim 20, further comprising recovering the correlation rule from the assist information.

30. The method of claim 20, further comprising recovering the correlation threshold value from the assist information.

31. The method of claim 20, wherein if the wireless link is established between the remote wireless node and the wireless node, the method further comprising determining whether to maintain the wireless link based, at least in part, on further correlation between the information and additional assist information received from the remote wireless node over the wireless link.

32. The method of claim 20, wherein the user model comprises user demographics and preferences.

33. The method of claim 20, wherein the user model comprises key words.

34. The method of claim 20, wherein the method further comprises creating and maintaining the user model based, at least in part, on user behavior.

35. The method of claim 20, wherein the information comprises metadata for a plurality of targeted content messages.

36. The method of claim 20, wherein the method, if the observed assist information correlates with the user model, further comprises correlating metadata for a plurality of targeted content messages with the observed assist information, and wherein the determination of whether the remote wireless node should establish a wireless link comprises determining whether to establish the wireless link based, at least in part, on the correlation between the metadata and the observed assist information.

37. The method of claim 20, wherein the information comprises metadata for a plurality of targeted content messages, or the method further comprises correlating metadata for a plurality of targeted content messages with the observed assist information following the correlation of the information with the observed assist information, wherein, if it is determined to establish the wireless link, the method further comprising providing the metadata correlating to the observed assist information to the remote wireless node over the wireless link.

38. The method of claim 37, further comprising receiving a signal from the remote wireless node indicating a subset of the metadata provided over the wireless link, and providing to the remote wireless node over the wireless link one or more of the targeted content messages corresponding to the subset of the metadata.

39. A computer product for a wireless node, comprising:
a non-transitory computer-readable medium, comprising:
code for storing a first threshold value;
code for recovering a second threshold value from observed assist information;
code for selecting one of the first and second threshold values as a correlation threshold value;
first code for correlating information with the observed assist information from a remote wireless node by computing a correlation metric based on a correlation rule and comparing the computed correlation metric to the correlation threshold value, the information comprising a user model for the wireless node; and
second code for determining whether the remote wireless node should establish a wireless link based, at least in part, on the correlation.

40. The computer product of claim 39, wherein the second code is configured to determine whether the remote wireless node should establish the wireless link with the wireless node.

41. The computer product of claim 39, wherein the information comprises observed assist information from another remote wireless node, and wherein the second code is configured to determine whether the remote wireless node should establish the wireless link with said another remote wireless node.

42. The computer product of claim 39, the non-transitory computer-readable medium further comprising code for correlating the information with observed assist information from another remote wireless node, the second code being configured to determine whether the remote wireless node should establish the wireless link with said another remote wireless node based, at least in part, on the correlation of the information with the observed assist information from said another remote wireless node.

43. The computer product of claim 42, wherein the non-transitory computer-readable medium further comprises code for correlating the observed assist information from the remote wireless node and said another remote wireless node if the information correlates with the observed assist information from the said another remote wireless node, the second code further configured to determine whether the remote wireless node should establish the wireless link with said another remote wireless node based, at least in part, on the correlation of the observed assist information from the remote wireless node and said another remote wireless node.

44. The computer product of claim 39, wherein the non-transitory computer-readable medium further comprises code for supporting the wireless link between the remote wireless node and another remote wireless node.

45. The computer product of claim 39, wherein the non-transitory computer-readable medium further comprises code for signaling the remote wireless node and another remote wireless node to establish the wireless link between the remote wireless node and said another remote wireless node.

46. The computer product of claim 39, wherein the non-transitory computer-readable medium further comprises code for recovering the observed assist information from a reference broadcast by the remote wireless node.

47. The computer product of claim 39, wherein the observed assist information comprises a portion of the user model for the remote wireless node.

48. The computer product of claim 39, wherein the non-transitory computer-readable medium further comprises code for recovering the correlation rule from the assist information.

49. The computer product of claim 39, wherein the non-transitory computer-readable medium further comprises code for recovering the correlation threshold value from the assist information.

50. The computer product of claim 39, wherein if the wireless link is established between the remote wireless node and the wireless node, the non-transitory computer-readable medium further comprises code for determining whether to maintain the wireless link based, at least in part, on further correlation between the information and additional assist information received from the remote wireless node over the wireless link.

51. The computer product of claim 39, wherein the user model comprises user demographics and preferences.

52. The computer product of claim 39, wherein the user model comprises key words.

53. The computer product of claim 39, wherein the non-transitory computer-readable medium further comprises code for creating and maintaining the user model based, at least in part, on user behavior.

54. The computer product of claim 39, wherein the information comprises metadata for a plurality of targeted content messages.

55. The computer product of claim 39, wherein the non-transitory computer-readable medium, if the observed assist information correlates with the user model, further comprises code for correlating metadata for a plurality of targeted content messages with the observed assist information, the second means being configured to determine whether to establish the wireless link based, at least in part, on the correlation between the metadata and the observed assist information.

56. The computer product of claim 39, wherein the information comprises metadata for a plurality of targeted content messages, or the non-transitory computer-readable medium further comprises code for correlating metadata for a plurality of targeted content messages with the observed assist information following the correlation of the information with the observed assist information, wherein, if the second code determines to establish the wireless link, the non-transitory computer-readable medium further comprises code for providing the metadata correlating to the observed assist information to the remote wireless node over the wireless link.

57. The computer product of claim 56, wherein the non-transitory computer-readable medium further comprises code for receiving a signal from the remote wireless node indicating a subset of the metadata provided over the wireless link, and code for providing to the remote wireless node over the wireless link one or more of the targeted content messages corresponding to the subset of the metadata.

* * * * *